United States Patent [19]

Miyamoto et al.

[11] Patent Number: 5,255,081
[45] Date of Patent: Oct. 19, 1993

[54] COLOR TELEVISION CAMERA APPARATUS AND METHOD FOR PRODUCING AN ANALOG VIDEO SIGNAL FOR USE WITH A PLURALITY OF VIDEO STANDARD SYSTEM

[75] Inventors: Kazuyoshi Miyamoto; Takashi Asaida, both of Kanagawa, Japan

[73] Assignee: Sony Corporation, Tokyo, Japan

[21] Appl. No.: 839,164

[22] Filed: Feb. 21, 1992

[30] Foreign Application Priority Data

Feb. 25, 1991 [JP] Japan .................. 3-050213

[51] Int. Cl.⁵ .............................. H04N 9/04
[52] U.S. Cl. ...................... 358/41; 358/50; 358/51; 358/31
[58] Field of Search ......... 358/41, 23, 24, 30, 358/31, 39, 40, 50, 51, 44, 11

[56] References Cited

U.S. PATENT DOCUMENTS

| 4,599,640 | 7/1986 | Dischert | 358/50 |
| 5,043,803 | 8/1991 | Asaida | 358/41 |
| 5,095,364 | 3/1992 | Asaida | 358/51 |
| 5,103,299 | 4/1992 | Asaida | 358/41 |

FOREIGN PATENT DOCUMENTS

| 0177320 | 4/1986 | European Pat. Off. . |
| 0367925 | 5/1990 | European Pat. Off. . |
| 0368354 | 5/1990 | European Pat. Off. . |
| 0420612 | 4/1991 | European Pat. Off. . |
| 2099652 | 12/1982 | United Kingdom . |

Primary Examiner—Victor R. Kostak
Assistant Examiner—Sherrie Hsia
Attorney, Agent, or Firm—William S. Frommer; Alvin Sinderbrand

[57] ABSTRACT

In a color television camera apparatus, a 2fs-rate luminance signal and fs-rate chrominance signals are selectively generated by a matrix circuit 8, in conformity with a plurality of standard systems, from 2fs-rate three-color image pick-up signals generated by an image signal pick-up unit. The fs-rate chrominance signals are modulated by a modulating circuit 12 into fs-rate modulated chrominance signals which are converted by a rate converter 13 into 2fs-rate modulated chrominance signals. The 2fs-rate luminance signals and the 2fs-rate modulated chrominance signals are combined by an adder 14 into 2fs-rate digital composite video signals which are converted by a D/A converter 15 into analog composite video signals. In this manner, analog composite video signals, in which the bandwidth of the luminance signals has been enhanced up to the sampling frequency fs, may be selectively outputted in conformity with a plurality of standard systems.

10 Claims, 7 Drawing Sheets

FIG.3(A) IMAGE PICKUP OUTPUT SIGNALS ($S_R*$, $S_G*$, $S_B*$)
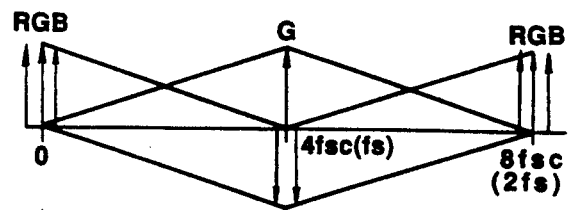

FIG.3(B) INTERPOLATED COLOR SIGNALS ($D_R$, $D_G$, $D_B**$)
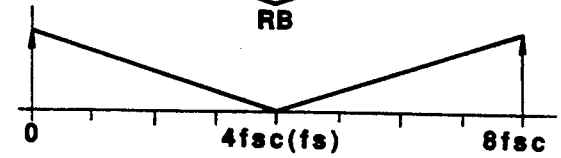

FIG.3(C) LUMINANCE SIGNAL ($D_Y**$) CHROMINANCE SIGNAL ($D_I*$, $D_Q*$)
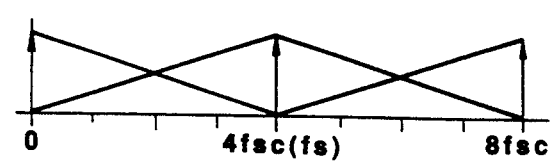

FIG.3(D) FILTER OUTPUT OF CHROMINANCE SIGNAL ($D_I*$, $D_Q*$)
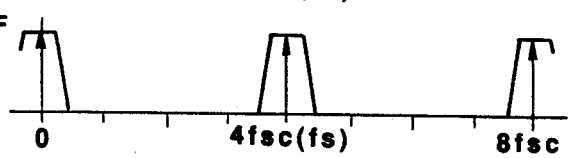

FIG.3(E) MODULATED CHROMINANCE SIGNALS (MOD. $C*$)
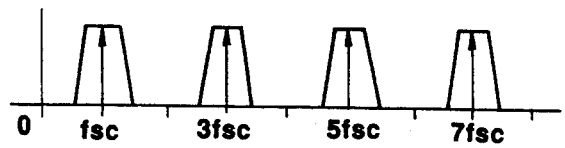

FIG.3(F) CHARACTERISTICS INTERPOLATION FILTER

FIG.3(G) MODULATED CHROMINANCE SIGNALS (MOD. $C**$)
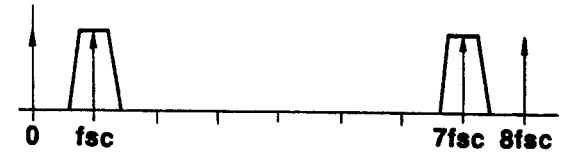

FIG.3(H) COMPOSITE VIDEO SIGNAL ($D_{cs}**$)
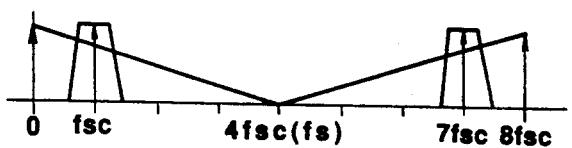

FIG.3(I) POST FILTER CHARACTERISTICS
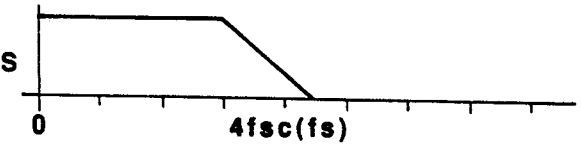

FIG.3(J) COMPOSITE VIDEO SIGNAL (CS)
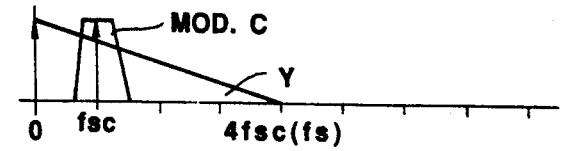

FIG.4 (A) IMAGE PICKUP OUTPUT SIGNALS (SR*, SG*, SB*)
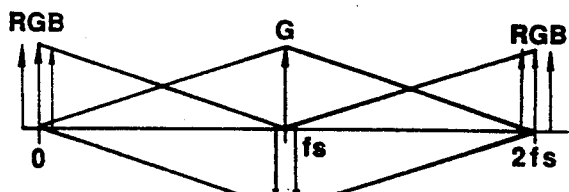

FIG.4 (B) INTERPOLATED COLOR SIGNALS (DR, DG, DB**)
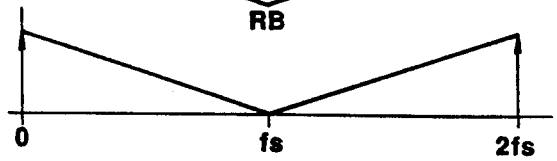

FIG.4 (C) LUMINANCE SIGNAL (DY**) CHROMINANCE SIGNAL (DV*, DU*)
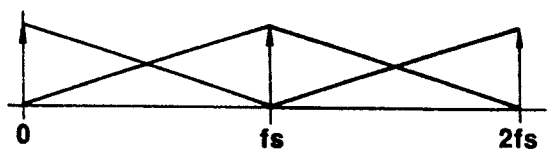

FIG.4 (D) FILTER OUTPUT OF CHROMINANCE SIGNAL (DV*, DU*)
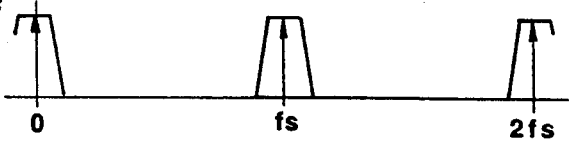

FIG.4 (E) MODULATED CHROMINANCE SIGNALS (MOD. C*)
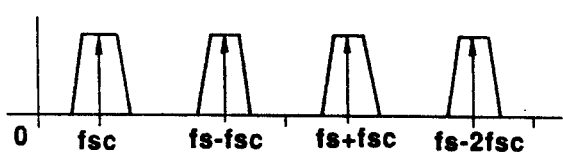

FIG.4 (F) CHARACTERISTICS INTERPOLATION FILTER
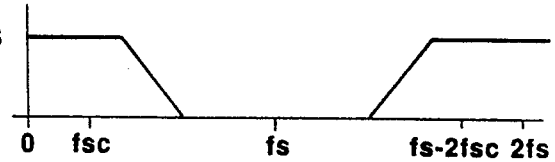

FIG.4 (G) MODULATED CHROMINANCE SIGNALS (MOD. C**)
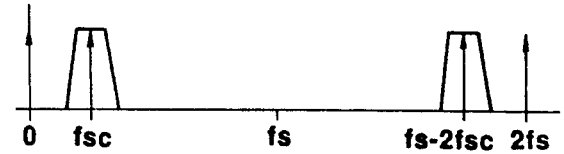

FIG.4 (H) COMPOSITE VIDEO SIGNAL (Dcs**)
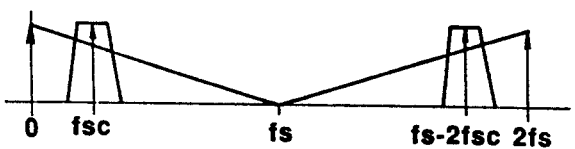

FIG.4 (I) POST FILTER CHARACTERISTICS
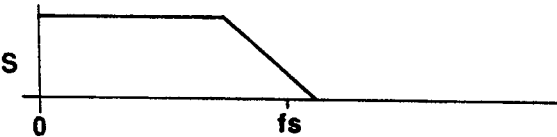

FIG.4 (J) COMPOSITE VIDEO SIGNAL (CS)
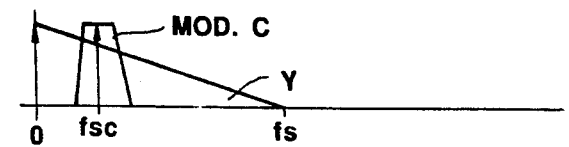

COLOR TELEVISION CAMERA APPARATUS AND METHOD FOR PRODUCING AN ANALOG VIDEO SIGNAL FOR USE WITH A PLURALITY OF VIDEO STANDARD SYSTEM

BACKGROUND OF THE INVENTION

1. Field of the Invention

This invention relates to color television camera apparatus and color television signal generating methods.

2. Description of the Prior Art

In a solid-state imaging device comprising a solid-state image sensor having a discrete pixel structure, including for example charge-coupled devices (CCDs), used as image pick-up means, since the solid-state image sensor itself represents a sampling system, aliasing components from spatial sampling frequencies fs are mixed into image pick-up output signals of the solid-state image sensor.

In a color television camera device, known arrangements for generating a color image include a two CCD type solid-state image pick-up device for forming three color images with a solid-state image sensor forming a green color image and a solid-state image sensor with a color coding filter forming red color pixels and blue color pixels of a color image, and a three CCD type solid-state image pick-up device forming three color images by separate solid-state image sensors.

There is also known a so-called spatial pixel shifting method, in which, to improve the resolution in the above-mentioned multiple CCD imaging devices, the solid-state image sensor for forming a red color image and the solid-state image sensor for forming a blue color image are shifted with respect to the solid-state imaging device for forming a green color image by one-half the pixel sampling period. With this spatial pixel shifting method, it becomes possible with an analog output multiple CCD imaging device to realize high resolution exceeding the upper limit imposed by the number of pixels of the solid-state image sensors.

On the other hand, in a color television camera device for digitally processing image pick-up output signals, digital signal processing is effected using a clock rate equal to approximately four times the color sub-carrier frequency $f_{SC}$. In this case, the output bandwidth of composite video signals CS, produced on mixing luminance signals Y with modulated chrominance signals MOD.C, is limited to less than 2fs, for preventing the composite video signals from being affected by high harmonics of the color sub-carrier frequency $f_{SC}$. In general, a clock rate equal to four times the color sub-carrier frequency $f_{SC}$, is adopted in a color television camera device of the NTSC system, while a clock rate fs equal to 908 or 944 times the horizontal scanning frequency $f_H$ of the PAL system, is used in a color television camera device of the PAL system.

Meanwhile, to improve television picture quality, attempts are being made to increase the bandwidth range of television signals. However, With a color television camera device for digitally processing the image pick-up output signals from a solid state image sensor having a discrete pixel structure, such as CCDs, as described above, if the output bandwidth of the composite video signals is increased to more than 2fs, color signal components may be suppressed unnecessarily, or distortion due to higher harmonics may be produced in the color sub-carrier signals, thereby deteriorating the picture quality.

On the other hand, with a color television device for digitally processing image output signals, as described above, where the clock rate fs is equal to $4f_{sc}$ in the NTSC system, or the clock rate fs is equal to $908f_H$ or $944f_H$ in the PAL system it is necessary to construct the digital signal processor differently, depending on the television system and hence the clock rate.

SUMMARY OF THE INVENTION

One object of the present invention is to provide an improved color television camera apparatus.

Another object of the present invention is to provide an improved color television signal generating method.

Another object of the present invention is to provide a color television camera device for digitally processing an image pick-up output of a solid-state image sensor having a discrete pixel structure, such as a CCD, in which high resolution composite video signals may be selectively produced for any of a plurality of standard television systems without unnecessary suppression of color signal components or distortion of the color sub-carrier by high harmonics.

According to the present invention there is provided a color television camera apparatus comprising: image signal generating means for generating digital three-color image signals at 2fs-rate (where $fs \approx 4f_{sc}$, and $f_{sc}$ is the sampling clock rate);

luminance signal generating means for selectively generating a digital luminance signal at 2fs-rate for a plurality of video standard systems from the digital three-color image signals;

chrominance signal generating means for selectively generating a digital chrominance signal at fs-rate for the plurality of video standard systems from the digital three-color image signals; modulating means for modulating said fs-rate digital chrominance signals;

rate converting means for converting modulated chrominance signals from said modulating means into 2fs-rate signals, said rate converting means including filter means having a plurality of transfer functions, said transfer function being selected according to the selected video standard system;

composite video signal generating means for generating a digital composite video signal at 2fs-rate according to the 2fs-rate digital luminance signal and the 2fs-rate modulated chrominance signal from the rate converting means; and digital-to-analog converting means for converting said 2fs-rate digital composite video signal into an analog signal.

In an embodiment of the color television camera apparatus according to the present invention, 2fs-rate digital luminance signals are selectively generated by luminance signal generating means from 2fs-rate digital three-color image pick-up signals from image pick-up signal generating means in conformity with a plurality of standard systems. The fs-rate digital chrominance signals are selectively generated by chrominance signal generating means in conformity with different standard systems. The fs-rate modulated chrominance signals are generated from the fs-rate digital chrominance signals and are converted by rate converting means into 2fs-rate modulated chrominance signals. The 2fs-rate digital composite video signals are generated by composite video signal generating means from the 2fs-rate digital luminance signals and the 2fs-rate modulated chrominance signals, and are converted into corresponding analog signals by digital/analog converting means for outputting analog composite video signals.

The rate converting means effects rate conversion of the digital chrominance signals generated by the chrominance signal generating means using transfer functions selected in conformity with the different standard systems for converting the fs-rate modulated chrominance signals from the modulating means into 2fs-rate modulated chrominance signals.

According to the present invention there is also provided a color television signal generating method, said method comprising: generating digital three-color image signals at 2fs-rate (where $fs=4f_{sc}$, and $f_{sc}$ is the sampling clock rate) selectively generating a digital luminance signal at 2fs-rate for a plurality of video standard systems from the digital three-color image signals;

selectively generating a digital chrominance signal at fs-rate for the plurality of video standard systems from the digital three-color image signals;

modulating said fs-rate digital chrominance signals;

converting the modulated chrominance signals into 2fs-rate signals by filtering the demodulated chrominance signal using selected transfer functions according to the selected video standard system; generating digital composite video signal at 2fs-rate from the 2fs-rate digital luminance signal and the 2fs-rate modulated chrominance signal; and converting said 2fs-rate digital composite video signal into an analog signal.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 3A to 3J are graphs for illustrating the imaging operation of the apparatus of FIG. 1 for the NTSC system;

FIGS. 4A to 4J are graphs for illustrating the imaging operation of the apparatus of FIG. 1 for the NTSC system;

DESCRIPTION OF THE PREFERRED EMBODIMENTS

Figure 1:
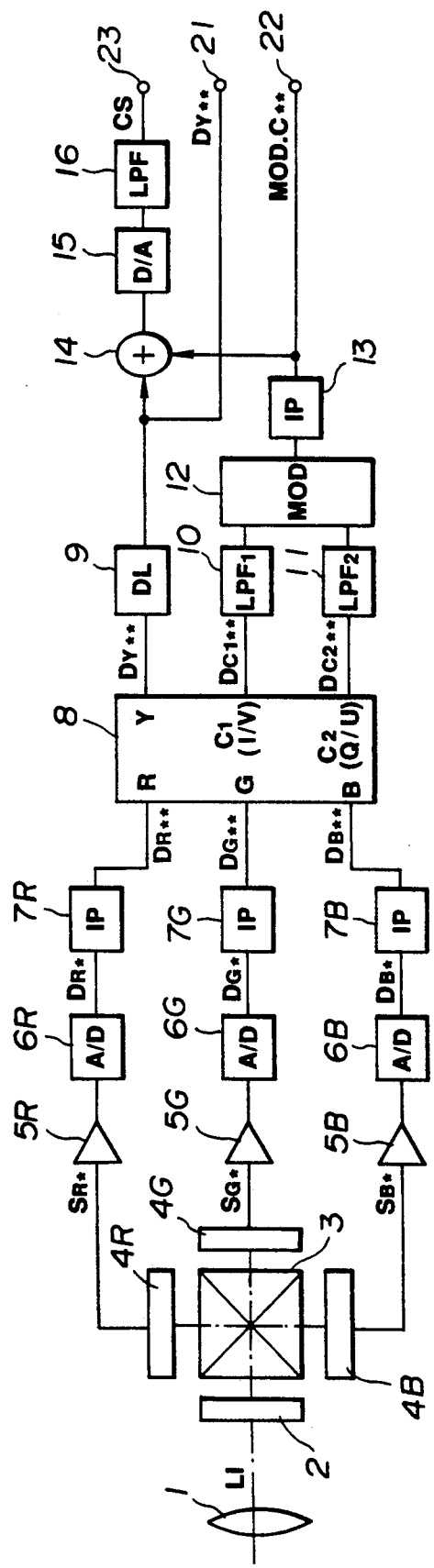
FIG. 1 is a block diagram of an embodiment of color television camera apparatus according to the present invention.

A preferred embodiment of color television camera apparatus according to the present invention is arranged as shown for example in FIG. 1.

In the color television apparatus shown in FIG. 1, the present invention is applied to a three CCD chip type solid state imaging device in which imaging light $L_i$ incident from an imaging lens 1 via an optical low-pass filter 2 is separated by a color separating prism 3 into three color light components for forming three color images on three CCD image sensors 4R, 4G and 4B, and in which analog composite video signals of the NTSC system or the PAL system may be selectively derived.

Figure 2:
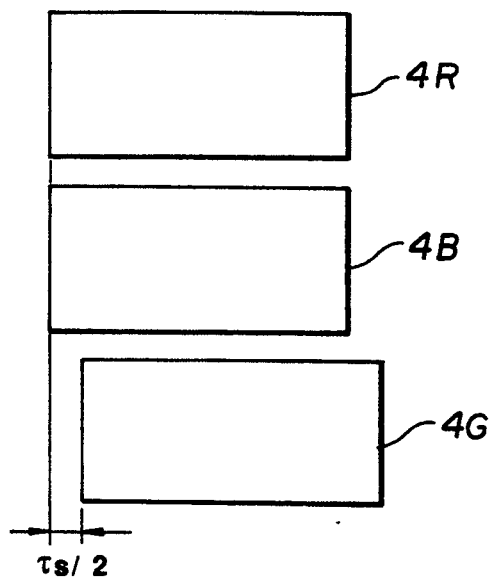
FIG. 2 is a schematic view of an array of CCD image sensors in the apparatus of FIG. 1.

In the present embodiment, the three CCD image sensors 4R, 4G and 4B, making up an image pick-up of the apparatus, are arranged on the basis of the spatial pixel shifting system, so that the CCD image sensor 4R for red color image sensing and the CCD image sensor 4B for blue color image sensing are shifted by one half the spatial pixel sampling period $\tau_s$ with respect to the CCD image sensor 4G for green color image sensing as, for example, illustrated in FIG. 2.

The three CCD image sensors 4R, 4G and 4B are driven by a CCD driving circuit, not shown, so that pixel image charges are read with read-out clocks of sampling frequencies fs as set in accordance with first to third operating modes which will be explained below.

In the first operating mode, which is that for an NTSC system image pick-up, the pixel image charges are read with read-out clocks of the sampling frequency fs equal to four times the color sub-carrier frequency $f_{SC}$ of the NTSC system. In the second and third operating modes, which are those for a PAL system image pick-up, the pixel image charges are read with read-out clocks of the sampling frequency fs equal to 908 times the horizontal scanning frequency $f_H$ of the PAL system, and with read-out clocks of the sampling frequency fs equal to 944 times the horizontal scanning frequency $f_H$ of the PAL system, respectively.

The three color object images are spatially sampled by the three CCD image sensors 4R, 4G and 4B, arranged in accordance with the above mentioned spatial pixel shifting system, such that the green color image is spatially sampled with a spatial shift of $\tau_s/2$ by the green color image sensing CCD image sensor 4G with respect to the red color image and the blue color image spatially sampled by the red and blue color image sensing CCD image sensors 4R and 4B. Thus the component of the sampling frequency fs of the green color image pickup output signal $S_{G^*}$ from the CCD image sensor 4G is reversely phased with respect to the component of the sampling frequency fs of the red color image pick-up output signal $S_{R^*}$ from the CCD image sensor 4R and the component of the sampling frequency fs of the blue color image pick-up output signal $S_{B^*}$ from the CCD image sensor 4B, as indicated in the signal spectrum charts of FIGS. 3A and 4A.

It is noted that FIG. 3A shows signal spectra of the three color image pick-up output signals $S_{R^*}$, $S_{G^*}$ and $S_{B^*}$, produced by the CCD image sensors 4R, 4G and 4B, respectively, when operating in the first mode, that is when performing image pick-up according to the NTSC system, while FIG. 4A shows signal spectra of the three color image pick-up output signals $S_{R^*}$, $S_{G^*}$ and $S_{B^*}$ produced by the CCD image sensors 4R, 4G and 4B, respectively, when operating in the second or third mode, that is when performing image pick-up according to the PAL system.

The image pick-up output signals $S_{R^*}$, $S_{G^*}$ and $S_{B^*}$, read from the CCD image sensors 4R, 4G and 4B by read-out clocks of the sampling frequency fs, are supplied via buffer amplifiers 5R, 5G and 5B to analog/digital converters 6R, 6G and 6B, respectively.

Each of the A/D converters 6R, 6G and 6B is supplied, by timing generators not shown, with clocks having a clock rate equal to the sampling rates fs of the image pick-up output signals $S_{R^*}$, $S_{G^*}$ and $S_{B^*}$, that is the clock frequencies fs equal to that of read-out clocks of the CCD image sensors 4R, 4G and 4B. The A/D converters 6R, 6G and 6B directly digitize the image pick-up output signals $S_{R*}$, $S_{G*}$ and $S_{B*}$ at the clock rates fs for generating the digital color signals $D_{R*}$, $D_{G*}$ and $D_{B*}$ having the same signal spectra as those of the image pick-up output signals $S_{R*}$, $S_{G*}$ and $S_{B*}$ shown in FIGS. 3A and 4A.

The digital color signals $D_{R*}$, $D_{G*}$ and $D_{B*}$, produced by the A/D converters 6R, 6G and 6B, are supplied to interpolators 7R, 7G and 7B, which interpolate the fs-rate image pick-up output signals $S_{R*}$, $S_{G*}$ and $S_{B*}$ to generate 2fs clock rate digital color signal $D_{R}$, $D_{G}$ and $D_{B**}$.

That is, in the present color television camera device, image pick-up signal generating means for outputting the digital color signals $D_{R}$, $D_{G}$ and $D_{B**}$ as 2fs-rate three color digital image pick-up output signals having the frequency distribution as shown in FIGS. 3B or 4B is formed by an image pick-up made up of the three CCD image sensors 4R, 4G and 4B arranged in accordance with the spatial pixel shifting system, the A/D converters 6R, 6G and 6B for digitizing the image pick-up output signals $S_{R*}$, $S_{G*}$ and $S_{B*}$ read from the CCD image sensors 4R, 4G and 4B at the sampling rate fs, and the interpolators 7R, 7G and 7B for interpolating the digital color signals $D_{R*}$, $D_{G*}$ and $D_{B*}$ from the A/D converters 6R, 6G and 6B for generating the 2fs-rate digital color signals $D_{R}$, $D_{G}$ and $D_{B**}$.

The three color image pick-up output signals $S_{R*}$, $S_{G*}$ and $S_{B*}$ from the CCD image sensors 4R, 4G and 4B, arranged in accordance with the above mentioned spatial pixel shifting system, cannot be processed directly, because the green color image pick-up output signal $S_{G*}$ is $\pi$ out of phase relative to the red and blue image pick-up output signals $S_{R*}$ and $R_{B*}$. However, as a result of the above mentioned interpolating operation by the interpolators 7R, 7G and 7B for generating the digital color signals $D_{R}$, $D_{G}$ and $D_{B**}$, the three color image pick-up output signals $S_{R*}$, $S_{G*}$ and $S_{B*}$ are in-phase with one another, and hence may be digitally processed.

If a solid-state image sensor having a number of pixels large enough to assure high resolution without using the spatial pixel shifting system were used as the image pick-up of the image pick-up output signal generator, the 2fs-rate digital three color image pickup output signals may be produced by the A/D converters without necessitating the interpolating operations.

The 2fs-rate digital color signals $D_{R}$, $D_{G}$ and $D_{B**}$ from the interpolators 7R, 7G and 7B forming the image signal pick-up output generators are supplied to a matrix circuit 8.

The matrix circuit 8 generates 2fs-rate digital luminance signals $D_{Y**}$ and fs-rate digital chrominance signals $D_{C1*}$, $D_{2C*}$ by performing a matrix processing operation on the 2fs-rate digital color signals $D_{R}$, $D_{G}$ and $D_{B**}$. When forming the fs-rate digital chrominance signals $D_{C1*}$, $D_{C2*}$ by the matrix circuit 8, the 2fs-rate digital color signals $D_{R}$, $D_{G}$ and $D_{B**}$ are down-sampled by a prefilter having a zero point at least at the frequency fs for generating the fs rate digital chrominance signals $D_{C1*}$, $D_{C2*}$.

Meanwhile, the matrix operation to be performed by the matrix circuit 8 is changed over depending on the first to third operating modes. In the first operating mode, the matrix circuit 8 performs the processing operation in accordance with the NTSC system for generating the 2fs-rate digital luminance signals $D_{Y**}$ and the fs rate digital chrominance signals $D_{C1*}$, $D_{C2*}$, as shown in FIG. 3C. In the second and the third operating modes, the matrix circuit 8 performs the processing operation in accordance with the PAL system for generating the 2fs-rate digital luminance signals $D_{Y**}$ and the fs-rate digital chrominance signals $D_{U1*}$, $D_{V2*}$, as shown in FIG. 4C.

The matrix circuit 8 transmits the 2f s-rate digital luminance signal $D_{Y}$ via a delay circuit 9 to an addition circuit 14 while also outputting the 2fs-rate digital luminance signals $D_{Y}$ at an output terminal 21. The matrix circuit 8 also transmits the fs-rate digital chrominance signals $D_{C1*}(D_{I*}/D_{V*})$, $D_{C2*}(D_{Q*}/D_{U*})$, generated by downsampling the 2fs-rate digital color signals $D_{R}$, $D_{G}$ and $D_{B**}$, to a modulating circuit 12 via low-pass filters 10 and 11.

Figure 5:
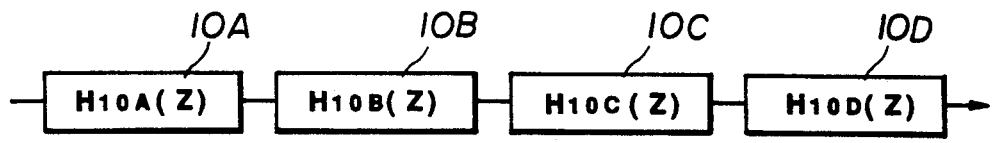
FIGS. 5 and 6 are equivalent block diagrams showing lowpass filters in the apparatus of FIG. 1.

The low-pass filter 10, supplied with the digital chrominance signals $D_{C1*}$, that is the digital chrominance signal $D_{I*}$ of the first operating mode according to the NTSC system, or the digital chrominance signal $D_{V*}$ of the second or third operating mode according to the PAL system, performs a filtering operation, represented by a transfer function $H_{10}(Z)$ given by:

$$H_{10}(z) = \frac{1}{2^8}(z^{-2} + 2z^{-1} + \quad (1)$$

$$1)^2(z^{-4} + 2z^{-2} + 1)(-z^{-6} + 2z^{-4} + 2z^{-3} + z^{-2} - 1)$$

on the digital chrominance signals $D_{C1*}$, and is made up of first to fourth filter blocks 10A, 10B, 10C and 10D, as shown in the equivalent block diagram of FIG. 5.

The first filter block 10A performs a filtering operation, represented by a transfer function $H_{10A}(z)$ given by:

$$H_{10A}(z) = \frac{1}{2^2}(-z^{-6} + 2z^{-4} + 2z^{-3} + z^{-2} - 1) \quad (2)$$

on the digital chrominance signal $D_{C1*}(D_{I*}/D_{V*})$ supplied from the matrix circuit 8. The first filter block 10A transmits output signals to the second filter block 10B.

The second filter block 10B performs a filtering operation, represented by a transfer function $H_{10B}(z)$ given by:

$$H_{10B}(z) = \frac{1}{2^2}(-z^{-4} + 2z^{-2} + 1) \quad (3)$$

on output signals of the first filter block 10A. The second filter block 10B transmits output signals to the third filter block 10C.

The third filter block 10C performs a filtering operation, represented by a transfer function $H_{10C}(z)$ given by:

$$H_{10C}(z) = \frac{1}{2^2}(-z^{-2} + 2z^{-1} + 1) \quad (4)$$

on output signals of the second filter block 10B. The third filter block 10C transmits output signals to the fourth filter block 10D.

The fourth filter block 10D performs a filtering operation, represented by a transfer function $H_{10D}(z)$ given by:

$$H_{10D}(z) = \frac{1}{2^2}(-z^{-2} + 2z^{-1} + 1) \quad (5)$$

on output signals of the third block 10C. The fourth filter block 10D transmits output signals to the modulating circuit 12.

Figure 6:
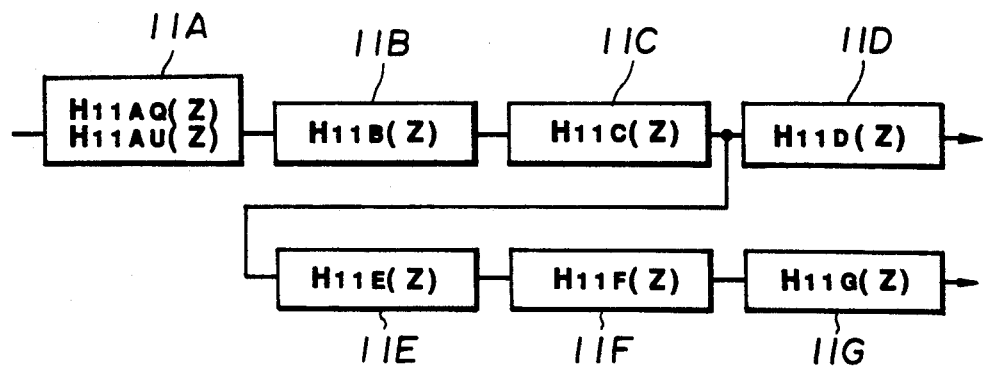

The low-pass filter 11, supplied with the digital chrominance signals $D_{C2^*}$, that is the digital chrominance signal $D_{Q^*}$ of the first operating mode according to the NTSC system, or the digital chrominance signal $D_{U^*}$ of the second or third operating mode according to the PAL system, performs a filtering operation, represented by a transfer function $H_{11Q}(z)$ given by:

$$H_{11Q}(z) = \frac{1}{2^{11}}(z^{-3} + 1)(z^{-1} + 1)(3z^{-4} + 2z^{-2} + 3)(z^{-2} + 2z^{-1} + 1)(x^{-4} + 2z^{-2} + 1)(-z^{-8} + 2z^{-5} + 2z^{-4} + z^{-3} - 1) \quad (6)$$

on the digital chrominance signals $D_{Q^*}$ of the NTSC system, and a filtering operation, represented by a transfer function $H_{11U}(z)$ given by:

$$H_{11U}(z) = \frac{1}{2^8}(z^{-2} + 2z^{-1} + 1)^2(z^{-4} + 2z^{-2} + 1)(-z^{-6} + 2z^{-4} + 2z^{-3} + z^{-2} - 1) \quad (7)$$

on the digital chrominance signals $D_{U^*}$ of the PAL system, and is made up of first to seventh filter blocks 11A, 11B, 11C, 11D, 11E, 11F and 11G, as shown in the equivalent block diagram of FIG. 6.

The first filter block 11A performs filtering operations, represented by two difference transfer functions $H_{11AQ}(z)$, $H_{11AU}(z)$, which are changed over between the first operating mode and the second or third operating mode, on the digital chrominance signals $D_{C2^*}$ ($D_{Q^*}/D_{U^*}$) supplied from the matrix circuit 8. The first filter block 11A transmits output signals to the second filter block 11B.

That is, in the first operation mode, the first filter block 11A performs a filtering operation, represented by the transfer function $H_{11AQ}(z)$, given by equation (8) below, on the digital chrominance signal $D_{2C^*}$ generated by the matrix circuit 8, that is the digital chrominance signals $D_{Q^*}$ of the NTSC system, and transmits output signals to the second filter block 11B.

$$H_{11AQ}(z) = \frac{1}{2^2}(-z^{-8} + 2z^{-5} + 2z^{-4} + z^{-3} - 1) \quad (8)$$

On the other hand, in the second and third operation mode, the first filter block 11A performs a filtering operation, represented by the transfer function $H_{11AU}(z)$, given by equation (9) below, on the digital chrominance signals $D_{2C^*}$ generated by the matrix circuit 8, that is the digital chrominance signals $D_{U^*}$ of the PAL system, and transmits output signals to the second filter block 11B.

$$H_{11AU}(z) = \frac{1}{2^2}(-z^{-6} + 2z^{-4} + 2z^{-3} + z^{-2} - 1) \quad (9)$$

The second filter block 11B performs a filtering operation represented by a transfer function $H_{11B}(z)$ given by:

$$H_{11B}(z) = \frac{1}{2^2}(z^{-4} + 2z^{-2} + 1) \quad (10)$$

on output signals of the first filter block 11A. The second filter block 11B transmits output signals to the third filter block 11C.

The third filter block 11C performs a filtering operation, represented by a transfer function $H_{11C}(z)$ given by:

$$H_{11C}(z) = \frac{1}{2^2}(z^{-2} + 2z^{-1} + 1) \quad (11)$$

on output signals of the second filter block 11B. The third filter block 11C transmits output signals to the fourth filter block 11D and to the fifth filter block 11E.

The fourth filter block 11D performs a filtering operation, represented by a transfer function $H_{10D}(z)$ given by:

$$H_{11D}(z) = \frac{1}{2^2}(z^{-2} + 2z^{-1} + 1) \quad (12)$$

on output signals of the third filter block 11C. In the second and third operating modes, the fourth filter block 11D transmits output signals to the modulating circuit 12.

In the first operating mode, the fifth filter block 11E performs a filtering operation, represented by a filtering operation represented by the transfer function $H_{11E}(z)$ given by:

$$H_{11E}(z) = \frac{1}{2^3}(3z^{-4} + 2z^{-2} + 3) \quad (13)$$

on the output signals of the third filter block 11C, and transmits output signals to the sixth filter block 11F.

In the first operating mode, the sixth filter block 11F performs a filtering operation, represented by a filtering operation, represented by the transfer function $H_{11F}(z)$ given by:

$$H_{11F}(z) = \frac{1}{2}(z^{-1} + 1) \quad (14)$$

on the output signals of the fifth filter block 11E, and transmits output signals to the seventh filter block 11G.

In the first operating mode, the seventh filter block 11G performs a filtering operation, represented by a filtering operation represented by the function $H_{11G}(z)$ given by:

$$H_{11G}(z) = \frac{1}{2}(z^{-3} + 1) \quad (15)$$

on the output signals of the sixth filter block 11F, and transmits output signals to the modulating circuit 12.

Figure 7:
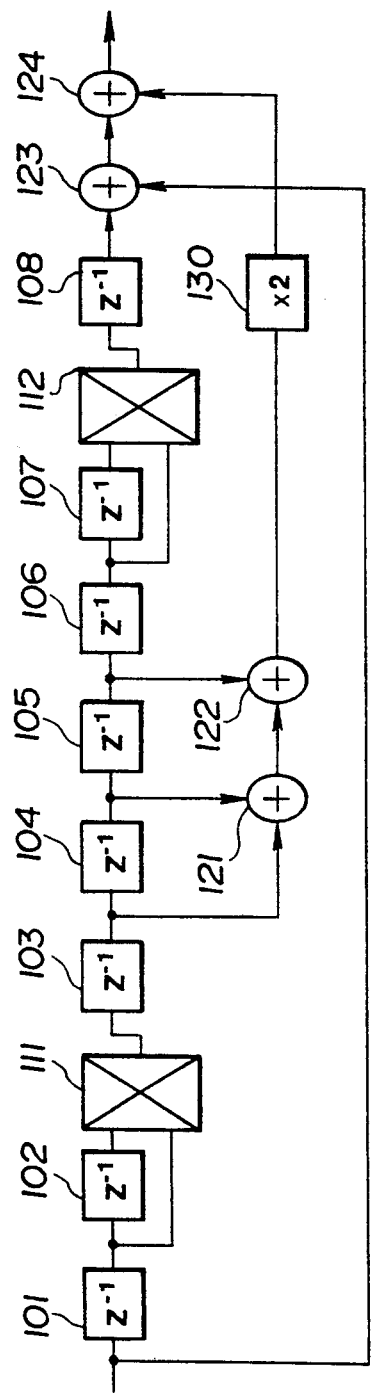
FIG. 7 is a block diagram showing an example of a first filter block forming the low-pass filter of FIG. 6.

The first filter block 11A of the low-pass filter 11 is arranged as shown for example in FIG. 7.

The first filter block 11A includes first to eighth tandem connected delay circuits 101 to 108, each for delaying input signals by one sampling period. The output signals of the first and second delay circuits 101 and 102 are selectively applied via a first switching circuit 111 to the third delay circuit 103, while the output signals of the sixth and seventh delay circuits 106 and 107 are selectively applied via a second switching circuit 112 to the eighth delay circuit 108.

The first filter block 11A includes first to fourth adders 121 to 124, and output signals of the third and fourth delay circuits 103 and 104 are summed by the first adder 121, while an output signal of the first adder 121 and an output signal of the fifth delay circuit 105 are summed together by the second adder 122. The input signal to the first delay circuit 101 and the output signal of the eighth delay circuit 108 are summed together by the third adder 123. The addition output signal of the third adder 123 is subtracted by the fourth adder 124 from a signal produced by multiplying the output signal of the second adder 122 by a coefficient "2" by a coefficient circuit 130, for supplying a predetermined filtered output.

By changing over the first switching circuit 111 for supplying output signals of the second delay circuit 102 to the third delay circuit 103 and by changing over the second switching circuit 112 for supplying output signals of the seventh delay circuit 107 to the eighth delay circuit 108, the filtering operation as shown by the transfer function $H_{11AQ}(z)$ of equation (8) may be performed in the above described first operating mode by the above described first filter block 11A on the NTSC system digital chrominance signals $D_{Q*}$ generated by the matrix circuit 8.

Also, changing over the first switching circuit 111 for supplying output signals of the first delay circuit 101 to the third delay circuit 103, and by changing over the second switching circuit 112 for supplying output signals of the sixth delay circuit 106 to the eight delay circuit 108, the filtering operation as shown by the transfer function $H_{11AU}(z)$ shown by equation (9) may be performed in the above described second and third operating modes by the above described first filter block 11A on the PAL system digital chrominance signals $D_{U*}$ generated by the matrix circuit 8.

The modulating circuit 12 effects quadrature two-phase modulation of the color sub-carrier with the fs rate digital chrominance signals $D_{C1*}(D_{I*}/D_{V*})$, $D_{C2*}(D_{Q*}/D_{U*})$ of the signal spectra shown in FIGS. 3D or 4D, which are supplied thereto from the matrix circuit 8 via the low-pass filters 10 and 11.

The fs-rate modulation chrominance signals MOD.C* obtained from the modulating circuit 12 correspond to modulated color signals containing odd harmonics of the color sub-carrier frequency $f_{sc}$ of the NTSC system, and having the frequency distribution as shown in FIG. 3E, in the first operating mode, while corresponding to the modulated color signals containing signal components of a difference frequency fs—$f_{sc}$ and a sum frequency fs+$f_{sc}$ of the sampling frequency fs and the color sub-carrier frequency $f_{sc}$ of the PAL system and having the frequency distribution as shown in FIG. 4E, in the second and third operating modes. The fs-rate modulated chrominance signals MOD.C* produced by the modulating circuit 12 are supplied to the addition circuit 14 via a rate converter 13, while being outputted at a signal output terminal 22.

Meanwhile, since the fs-rate modulated chrominance signals MOD.C*, produced by the modulating circuit 12, contain odd harmonics of the color sub-carrier frequency $f_{sc}$ of the NTSC system in the first operating mode, as mentioned hereinabove, the composite video signals fill would be affected by the 3$f_{sc}$ frequency components. On the other hand, since the fs-rate modulated chrominance signals MOD.C* contain signal components of the difference frequency fs—$f_{sc}$ and the sum frequency fs+$f_{sc}$ of the sampling frequency fs and the color sub-carrier frequency $f_{sc}$ of the PAL system, the composite video signals would be affected by the frequency component fs—$f_{sc}$.

In consideration of this, the rate converter 13 effects digital filtering on the fs-rate modulated chrominance signals MOD.C*, produced by the modulating circuit 12, for extracting the $f_{sc}$ and 7$f_{sc}$ frequency components, by means of filter characteristics thereof shown in FIG. 3F, in the first operating mode, for generating modulated chrominance signals MOD.C having a rate of 2fs corresponding to the 8$f_{sc}$ frequency distribution as shown in FIG. 3G, while extracting the $f_{sc}$ and 2fs—$f_{sc}$ frequency components by filter characteristics thereof shown in FIG. 4F, in the second and third operating modes, for generating 2fs-rate modulated chrominance signals MOD.C having the frequency distribution as shown in FIG. 4G.

Meanwhile, the rate converter 13 is formed by a digital filter transmitting the color sub-carrier frequency $f_{sc}$ and attenuating the frequency fs—$f_{sc}$ component. It suffices if the digital filter used in the rate converter 13 has filter characteristics in which the differential coefficient is approximately zero at the frequency $f_{sc}$ and there exists at lease one zero point in the vicinity of the frequency fs—$f_{sx}$.

In the first operating mode, the digital filter employed in the rate converter 13 effects digital filtering shown by a transfer function $H_{13A}(z)$ as given for example by:

$$H_{13A}(z) = \frac{1}{2^6}(-11z^{-6} + 33z^{-4} + 64z^{-3} + 33z^{-2} - 11) \quad (16)$$

In the second operating mode, the digital filter employed in the rate converter 13 effects digital filtering given by a transfer function $H_{13B}(z)$, for example:

$$H_{13B}(z) = \frac{1}{2^3}(-3z^{-6} + 2z^{-4} + 8z^{-3} + 2z^{-2} - 3) \quad (17)$$

In the third operating mode, the digital filter employed in the rate converter 13 effects digital filtering given by a transfer function $H_{13C}(z)$, example;

$$H_{13C}(z) = \frac{1}{2^5}(-9z^{-6} + 12z^{-4} + 32z^{-3} + 12z^{-2} - 9) \quad (18)$$

Figure 8:
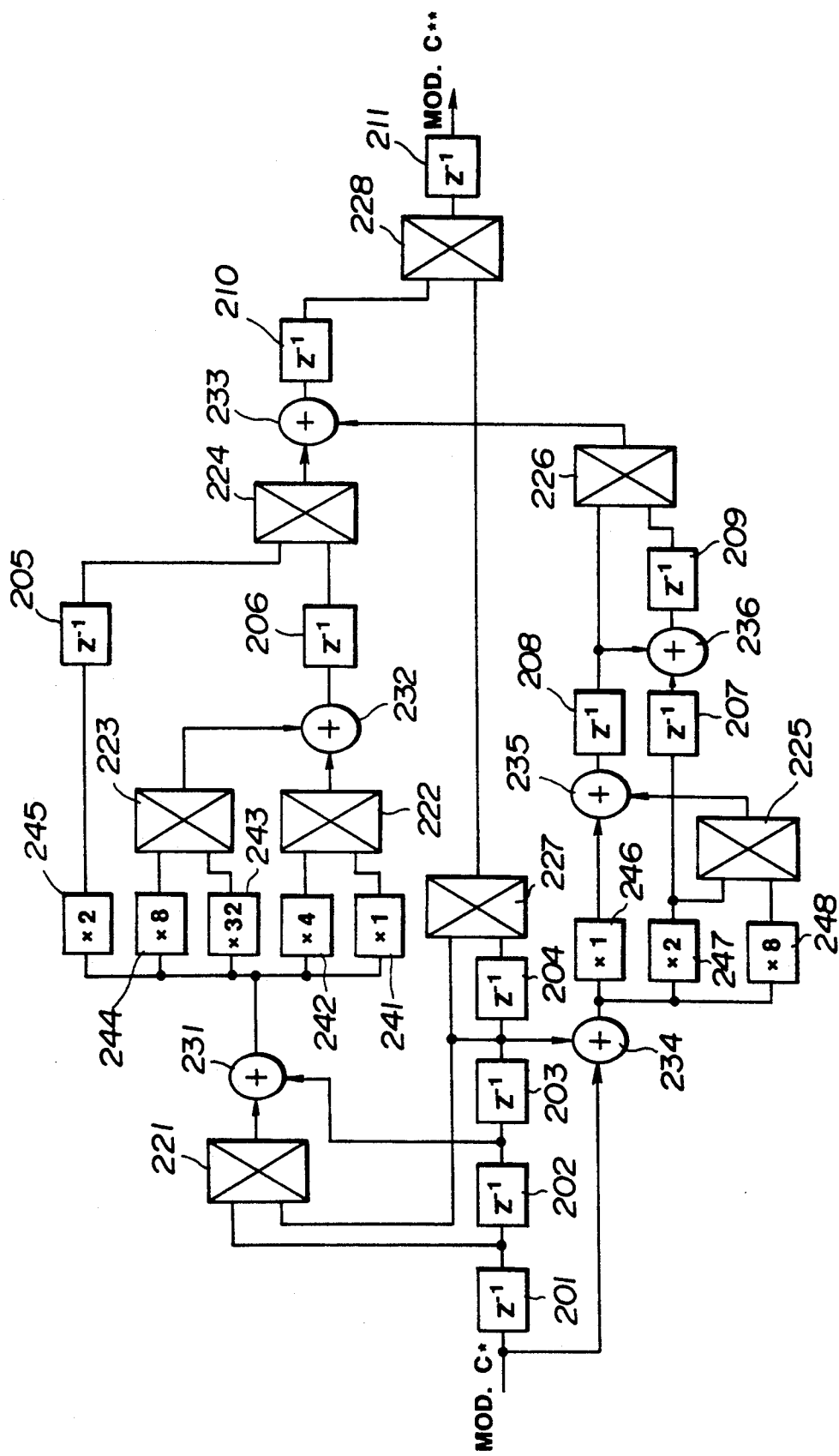
FIG. 8 is an equivalent block diagram showing a digital filter in the apparatus of FIG. 1.

As the rate converter 13 for effecting digital filtering operations depending on the various operating modes, a digital filter comprising first to eleventh delay circuits 201 to 211, first to eighth switching units 221 to 228, first to sixth adders 231 to 236 and first to eighth coefficient circuits 241 to 248, as shown in FIG. 8, is employed.

In the digital filter shown in FIG. 8, the first to eleventh delay circuits 201 to 211 delay input signals by one-half a sampling period. The second to fourth delay circuits 202 to 204 are connected in tandem to the first delay circuit 201 supplied with the modulated chrominance signals MOD.C* from the modulating circuit 12.

The first switching unit 221 selectively transmits an output signal of the first delay circuit 201 or an output signal of the third delay circuit 203 to a first adder 231. The first switching unit 221 is changed over for transmitting the output signals of the third delay circuit 203 to the first adder 231 in the first operating mode, and for transmitting the output signals of the first delay circuit 201 to the first adder 231 in the second and third operating modes.

The first adder 231 sums the output signal of the second delay circuit 202 with the output signal of the first delay circuit 201 or with the output signal of the third delay circuit 203, as selected by the switching unit 221. The sum output signal by the first adder 231 is supplied to first to fifth coefficient circuits 241 to 245.

The first coefficient circuit 241 multiplies the output of the first adder 231 by a coefficient "1" and transmits an output signal to the second switching unit 222.

The second coefficient circuit 242 multiplies the output of the first adder 231 by a coefficient "4" and transmits an output signal to the second switching unit 222.

The third coefficient circuit 243 multiplies the output of the first adder 231 by a coefficient "32" and transmits an output signal to the third switching unit 223.

The fourth coefficient circuit 244 multiplies the output of the first adder 231 by a coefficient "8" and transmits an output signal to the third switching unit 223.

The fifth coefficient circuit 245 multiplies the output of the first adder 231 by a coefficient "2" and transmits an output signal to the fifth delay circuit 205.

The second switching unit 222 transmits an output signal of the first coefficient circuit 241 and an output signal of the second coefficient circuit 242 selectively to the second adder 232. The second switching unit is changed over for transmitting an output signal of the first coefficient circuit 241 to the second adder 232 in the first operating mode and for transmitting an output signal from the second coefficient circuit 242 to the second adder 232 in the third operating mode.

The third switching unit 223 transmits an output signal of the third coefficient circuit 243 and an output signal of the fourth coefficient circuit 244 selectively to the second adder 232. The third switching unit 223 is changed over for transmitting an output signal of the third coefficient circuit 243 to the second adder 232 in the first operating mode and for transmitting an output signal from the fourth coefficient circuit 244 to the second adder 232 in the third operating mode.

The second adder 232 sums a signal supplied via the second switching unit 222 and a signal supplied via the third switching unit 223. The second adder 232 transmits a sum output signal to the fourth switching unit 224 via the sixth delay circuit 206.

The fourth switching unit 224 transmits an output signal of the fifth delay circuit 205 and an output signal of the sixth delay circuit 206 selectively to the third adder 233. The fourth switching unit 244 is changed over for transmitting an output signal of the fifth delay circuit 205 to the third adder 233 in the second operating mode and for transmitting an output signal from the sixth delay circuit 206 to the third adder 233 in the first and third operating modes.

The fourth adder 234 sums the modulated chrominance signal MOD.C* from the modulating circuit 12 and an output signal of the third delay circuit 203. A sum output signal of the fourth adder 234 is supplied to the sixth to eighth coefficient circuits 246 to 248.

The sixth coefficient circuit 246 multiplies the output of the fourth adder 234 by a coefficient "1" and transmits an output signal to the fifth adder 235.

The seventh coefficient circuit 247 multiplies the output of the fourth adder 234 by a coefficient "2" and transmits an output signal to the fifth adder 235, as hereinafter described, while transmitting the same output signal to the sixth adder 236 via the seventh delay circuit 207.

The eighth coefficient circuit 248 multiplies the output of the fourth adder 234 by a coefficient "8" and transmits output signal to the fifth adder 235, as hereinafter described.

The fifth switching unit 225 transmits an output signal of the seventh coefficient circuit 247 and an output signal of the eighth coefficient circuit 248 selectively to the fifth adder 235. The fifth switching unit 225 is changed over for transmitting an output signal of the seventh coefficient circuit 247 to the fifth adder 235 in the second operating mode, and for transmitting an output signal from the eighth coefficient circuit 248 to the fifth adder 225 in the first and third operating modes.

The fifth adder 235 sums an output signal of the sixth coefficient circuit 246 and an output signal supplied from the fifth switching unit 225. An output from the fifth adder 235 is transmitted via the eighth delay circuit 208 to the sixth adder 236 and to the sixth switching unit 226.

The sixth adder 236 sums an output signal of the seventh delay circuit 207 and an output signal supplied from the eighth delay unit 208. An output from the sixth adder 236 is transmitted via the ninth delay circuit 209 to the sixth switching unit 226.

The sixth switching unit 226 transmits an output signal of the eighth delay circuit 208 and an output signal of the ninth delay circuit 209 selectively to the third adder 233. The sixth switching unit 226 is changed over from transmitting an output signal of the ninth delay circuit 209 to the third adder 233 in the first operating mode and for transmitting an output signal from the eighth delay circuit 208 to the third adder 233 in the second and third operating modes.

The seventh switching unit 227 transmits an output signal of the third delay circuit 203 and an output signal of the fourth delay circuit 204 selectively to the eighth switching unit 228. The seventh switching unit 227 is changed over for transmitting an output signal of the fourth delay circuit 204 to the eighth switching unit 228 in the first operating mode, and for transmitting an output signal from the third delay circuit 203 to the eighth switching unit 228 in the second and third operating modes.

The third adder 233 sums an output signal of the fourth switching unit 224 and an output signal supplied from the sixth switching unit 226. An output from the third adder 223 is transmitted via the tenth delay circuit 210 to the eighth switching unit 238.

The eighth switching unit 228 selectively outputs a signal supplied from the seventh switching unit 227 or an output from the third adder 233 via the eleventh delay circuit 211.

With the above described digital filter, the first to sixth switching units 231 to 236 are changed over depending on the various operating modes, so that digital filtering operations given by the transfer functions $H_{13A}(z)$ as indicated by equation (16), $H_{13B}(z)$ as indicated by equation (17), and $H_{13C}(z)$ as indicated by equation (18) will be effected in the first, second and third operating modes, respectively.

The rate converter 13 effects digital filtering on the fs rate modulated chrominance signals MOD. C*, produced by the modulating circuit 12, for producing 2fs-rate modulated chrominance signals MOD.C in the first to third operating modes, which signals MOD.C are transmitted to the addition circuit 14.

The addition circuit 14 sums the 2fs-rate modulated chrominance signals MOD.C, produced by the rate converter 13, with the 2fs-rate digital luminance signals $D_{Y^{}}$ transmitted from the matrix circuit 8 via the delay circuit 9, for generating 2fs-rate digital composite video signals $D_{CS^{}}$ having the frequency distribution shown in FIGS. 3H or 4H. These 2fs-rate digital composite video signals $D_{CS^{}}$ are supplied to a digital/analog (D/A) converter 15.

Meanwhile, the delay circuit 9 delays the digital luminance signals $D_{Y^{}}$ by a delay time corresponding to a processing time required for generating the 2fs-rate modulated chrominance signals MOD.C from the digital chrominance signals $D_{C1^*}$, $D_{C2^*}$ from the matrix circuit 8.

The D/A converter 15 converts the 2fs-rate digital composite video signals $D_{CS^{**}}$ into corresponding analog signals which are supplied to a post-filter 16 having low-pass filter characteristics of transmitting low components less than approximately $4fs_{sc}$ or fs, as shown in FIG. 3I or FIG. 4I. In this manner, analog composite video signals CS conforming to the NTSC system or to the PAL system are selectively outputted at the signal output terminal 23.

Figure 9:
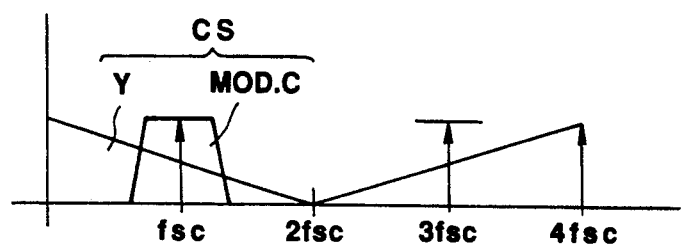
FIG. 9 is a graph showing the signal spectrum of the video composite signals generated by a known color television camera apparatus.

Since the analog composite video signals CS, from the signal output terminal 23, have been converted from the 2fs-rate digital composite video signals $D_{CS^{**}}$, the bandwidth of the luminance signals Y is enlarged to the sampling rate fs, as shown in FIG. 3J or FIG. 4J, for generating a high resolution picture, as compared to a video composite signal generated by a conventional color television camera as shown, for example, in FIG. 9.

Since the 2fs-rate modulated chrominance signals MOD.C, produced by the rate converter 13, are generated by interpolation by a digital filter transmitting the colour sub-carrier frequency component $f_{sc}$ and attenuating the fs $f_{sc}$ frequency component, so that they are free from the $3f_{sc}$ frequency component, as shown in FIG. 3G, when performing an imaging operation in the first operating mode in accordance with the NTSC system. The result is that the analog composite video signals CS, converted into the analog signals from the 2fs-rate digital composite video signals $D_{CS^{}}$ produced by summing the 2fs-rate modulated chrominance signals MOD.C to the 2fs-rate digital luminance signals $D_{Y^{}}$, are not accompanied by distortion due to high harmonics contained in the color sub-carrier signals.

On the other hand, when performing an imaging operation in the second or third operating mode in accordance with the PAL system, it becomes possible, by converting the 2fs-rate digital composite video signals $D_{CS^{**}}$ into corresponding analog signals by digital-/analog converting means, and by bandwidth-limiting the analog signals by the low-pass post-filter transmitting the low range components lower than fs, as shown in FIG. 4I, to produce the analog composite video signals CS of the PAL system which are free from aliasing components as shown in FIG. 4J, and in which the bandwidth of the luminance signals has been enlarged up to fs to give a high resolution picture.

In the color television camera device of the present invention, the 2fs-rate digital luminance signals are selectively formed by luminance signal generating means, in conformity with a plurality of standard systems, from the 2fs-rate digital three color image pick-up signals, generated from imaging signal generating means, while fs-rate digital chrominance signals are selectively formed by chrominance signal generating means, in conformity with a plurality of standard systems, and these fs-rate digital chrominance signals are converted by rate converting means into 2fs-rate modulated chrominance signals. The 2fs-rate digital composite video signals are formed by composite video signal forming means from the 2fs-rate digital luminance signals and 2fs-rate modulated chrominance signals, and are converted by digital analog converting means into analog signals for selectively outputting analog composite video signals in conformity with a plurality of standard systems. The rate converting means effects rate conversion of the digital chrominance signals generated by the chrominance signal forming means using a plurality of transfer functions selected in conformity with the different standard systems for converting the fs-rate modulated chrominance signals from the modulating means into 2fs-rate modulated chrominance signals. The 2fs-rate digital composite video signals, generated from the 2fs-rate digital luminance signals and the 2fs-rate modulated video signals, are converted into the analog form by digital analog converting means, for generating analog composite video signals which are free from distortion due to high harmonics of the color sub-carrier signals, and in which the bandwidth of the luminance signals has been enhanced to fs to give a high resolution picture.

It will be seen from above that the present invention provides a color television camera device for digitally processing an imaging output from a solid state sensor having a discrete pixel structure, such as CCDs, in which a plurality of high resolution composite video signals free from excessive suppression of color signal components or distortion due to high harmonic components of the color sub-carrier signal may be produced in conformity with different standard systems.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A color television camera apparatus comprising:
   image signal generating means for generating digital three-color image signals as a 2fs-rate, in which $fs \approx 4f_{sc}$ and $f_{sc}$ is a sampling clock rate;
   luminance signal generating means for selectively generating a digital luminance signal at a 2fs-rate so as to form a 2fs-rate digital luminance signal corresponding to a selected video standard system selected from among a plurality of video standard systems from the digital three-color image signals;
   chrominance signal generating means for selectively generating digital chrominance signals at a fs-rate so as to form fs-rate digital chrominance signals corresponding to the selected video standard system from the digital three-color image signals;
   modulating means for modulating said fs-rate digital chrominance signals corresponding to the selected video standard system;
   rate converting means having filter means for performing filtering represented by a selected transfer function selected from among a plurality of transfer functions for converting modulated chrominance signals from said modulating means into 2fs-rate modulated chrominance signals, in which the selected transfer function is selected according to the selected video standard system;

composite video signal generating means for generating a digital composite video signal at a 2fs-rate according to the 2fs-rate digital luminance signal and the 2fs-rate modulated chrominance signals from the rate converting means; and digital-to-analog converting means for converting said 2fs-rate digital composite video signal into an analog composite video signal.

2. A color television camera apparatus according to claim 1 wherein said image signal generating means comprises three CCD image sensors, analog-to-digital converting means for converting output signals from said three CCD image sensors into digital image signals, and interpolating means for generating the digital three-color image signal at 2fs-rate by interpolating the digital image signals from said analog-to-digital converting means.

3. A color television camera apparatus according to claim 1 wherein said plurality of video standard systems include a NTSC system and a PAL system.

4. A color television camera apparatus according to claim 1 further comprising an output terminal for outputting the 2fs-rate digital luminance signal.

5. A color television camera apparatus according to claim 3 wherein said PAL system includes a first PAL system having a 908$f_H$ clock rate and a second PAL system having a 944$f_H$ clock rate, in which $f_H$ represents a horizontal scanning frequency.

6. A color television camera apparatus according to claim 1 wherein said chrominance signal generating means includes down-sampling means having a filter having a zero point at least at a frequency fs for generating the fs rate digital chrominance signals.

7. A method for generating a color television signal, said method comprising the steps of:

generating digital three-color image signals at a 2fs-rate, in which fs≈4$f_{sc}$ and $f_{sc}$ is a sampling clock rate;

selectively generating a digital luminance signal at the 2fs-rate so as to form a 2fs-rate digital luminance signal corresponding to a selected video standard system selected from among a plurality of video standard systems from the digital three-color image signals;

selectively generating digital chrominance signals at a fs-rate so as to form fs-rate digital chrominance signals corresponding to the selected video standard system from the digital three color image signals;

modulating said fs-rate digital chrominance signals corresponding to the selected video standard system so as to form a modulated chrominance signals;

converting the modulated chrominance signals into 2fs-rate modulated chrominance signals by filtering the modulated chrominance signals using selected transfer functions according to the selected video standard system;

generating a digital composite video signal at the 2fs-rate from the 2fs-rate digital luminance signal and the 2fs-rate modulated chrominance signals; and converting said 2fs-rate digital composite video signal into an analog composite video signal.

8. A color television signal generating method according to claim 7 wherein said plurality of video standard systems include a NTSC system and a PAL system.

9. A color television camera apparatus comprising:

image signal generating means for generating digital three-color image signals at a 2fs-rate, in which fs≈4$f_{sc}$ and $f_{sc}$ is a sampling clock rate;

luminance signal generating means for selectively generating a digital luminance signal at the 2fs-rate so as to form a 2fs-rate digital luminance signal corresponding to a selected video standard system selected from among a NTSC and a PAL video standard systems from the digital three-color image signals;

chrominance signal generating means for selectively generating digital chrominance signals at a fs-rate corresponding to the selected video standard system from the digital three-color image signals;

first low-pass filter means connected to a first chrominance output terminal of said chrominance signal generating means for filtering an output signal from said first chrominance output terminal, said first low-pass filter means performing filtering represented by a transfer function given by:

$$H_{10}(z) = \frac{1}{2^8}(z^{-2} + 2z^{-1} + 1)^2(z^{-4} + 2z^{-2} +$$

$$1)(-z^{-6} + 2z^{-4} + 2z^{-3} + z^{-2} - 1)$$

second low-pass filter means connected to a second chrominance output terminal of the chrominance signal generating means for filtering an output signal from said second chrominance output terminal, said second low-pass filter means performing filtering represented by transfer functions given by:

$$H_{11Q}(z) = \frac{1}{2^{11}}(z^{-3} + 1)(z^{-1} + 1)(3z^{-4} + 2z^{-2} +$$

$$3)(z^{-2} + 2z^{-1} + 1)(z^{-4} + 2z^{-2} +$$

$$1)(-z^{-8} + 2z^{-5} + 2z^{-4} + z^{-3} - 1)$$

and $$H_{11U}(z) = \frac{1}{2^8}(z^{-2} + 2z^{-1} + 1)^2(z^{-4} + 2z^{-2} +$$

$$1)(-z^{-6} + 2z^{-4} + 2z^{-3} + z^{-2} - 1)$$

transfer function $H_{11Q}(z)$ being selected when the NTSC video system is selected and transfer function $H_{11U}(z)$ being selected when the PAL video system is selected;

modulating means for modulating output signals from said first and second low-pass filter means;

rate converting means having means for performing filtering represented by a transfer function selected from among a plurality of transfer functions for converting modulated filtered chrominance signals from said modulating means into a 2fs-rate modulated filtered chrominance signal, in which the transfer function of the rate converting means is selected according to the selected video standard system;

composite video signal generating means for generating a digital composite video signal at a 2fs-rate from the 2fs-rate digital luminance signal and the 2fs-rate modulated filtered chrominance signal from the rate converting means; and digital-to-analog converting means for converting said 2fs-rate digital composite video signal into an analog signal.

10. A color television camera apparatus comprising:

image signal generating means for generating digital three-color image signals at a 2fs-rate, in which $fs \approx 4f_{sc}$ and $f_{sc}$ is a sampling clock rate;

luminance signal generating means for selectively generating from the digital three-color image signals a digital luminance signal at the 2fs-rate so as to form a 2fs-rate digital luminance signal corresponding to a selected one of a NTSC video standard system, a first PAL video standard system having a 908 $f_H$ clock rate and a second PAL video standard system having a 944 $f_H$ clock rate, in which $f_H$ is a horizontal scanning frequency;

chrominance signal generating means for selectively generating from the digital three-color image signals digital chrominance signals at a fs-rate so as to form fs-rate digital chrominance signals corresponding to the selected video standard system;

modulating means for modulating said fs-rate digital chrominance signals;

rate converting means having filter means for performing filtering represented by a transfer function selected from among a plurality of transfer functions for converting modulated chrominance signals from said modulating means into 2fs-rate modulated chrominance signals, in which said plurality of transfer functions include:

$$H_{13A}(z) = \frac{1}{2^6}(-11z^{-6} + 33z^{-4} + 64z^{-3} + 33z^{-2} - 11)$$

$$H_{13B}(z) = \frac{1}{2^3}(-3z^{-6} + 2z^{-4} + 8z^{-3} + 2z^{-2} - 3) \text{ and}$$

$$H_{13C}(z) = \frac{1}{2^5}(-9z^{-6} + 12z^{-4} + 32z^{-3} + 12z^{-2} - 9),$$

and in which, transfer function $H_{13A}(z)$ being selected when the NTSC system is selected, transfer function $H_{13B}(z)$ being selected when the first PAL system is selected, and transfer function $H_{13C}(z)$ being selected when the second PAL video system is selected;

composite video signal generating means for generating a digital composite video signal at the 2fs-rate according to the 2fs-rate digital luminance signal and the 2fs-rate modulated chrominance signal from the rate converting means; and digital-to-analog converting means for converting said 2fs-rate digital composite video signals into an analog signal.

* * * * *